UNITED STATES PATENT OFFICE.

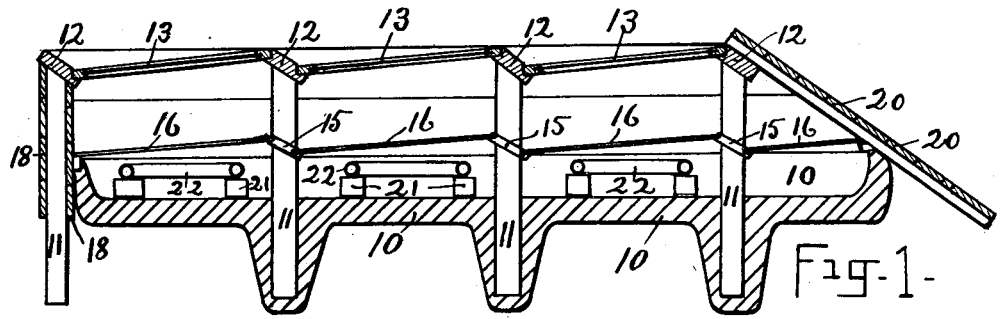
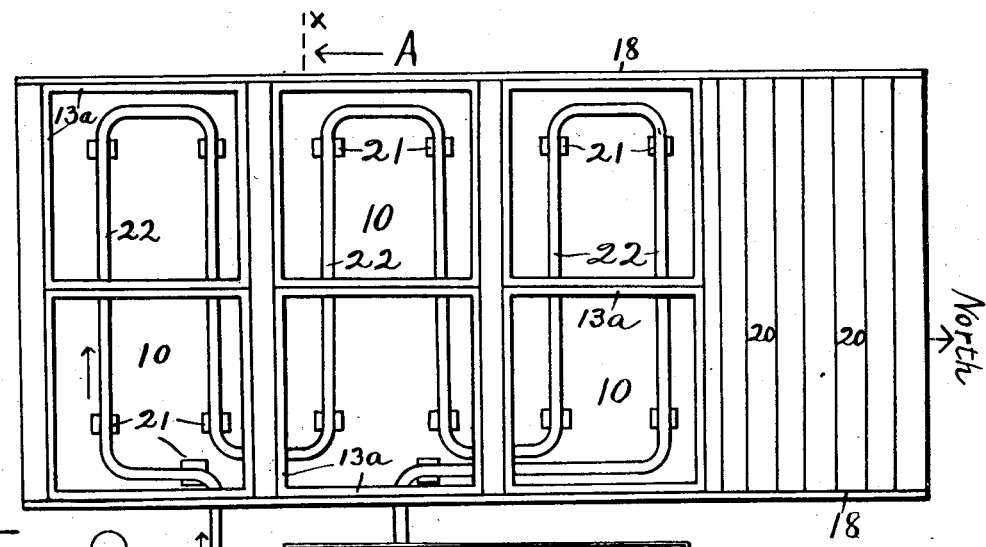
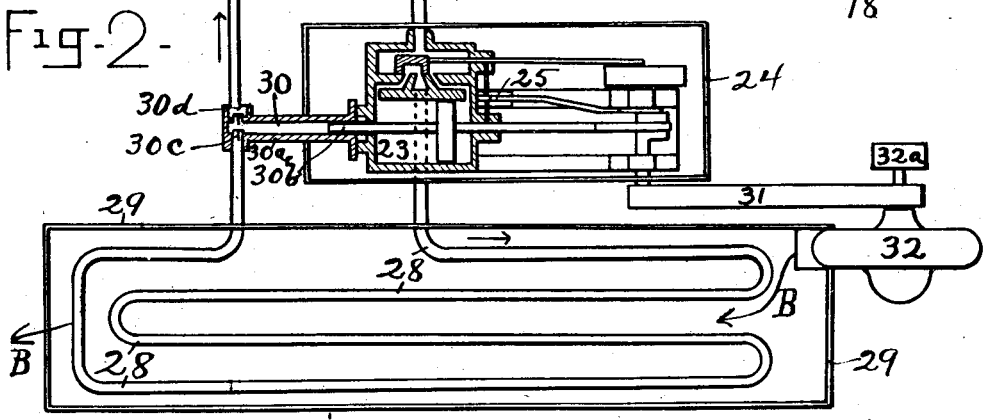

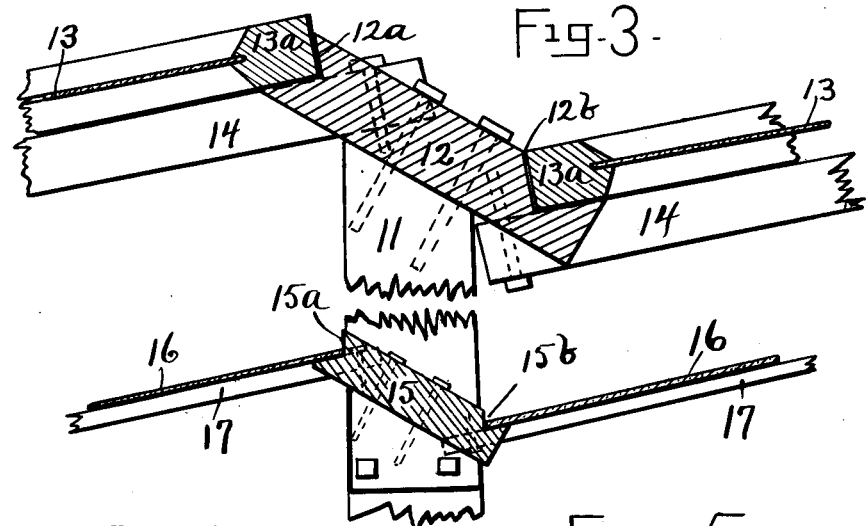
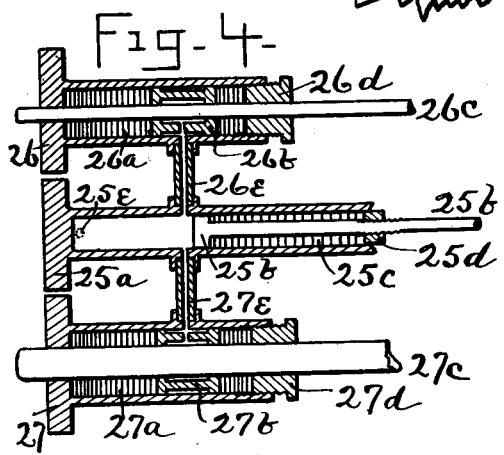
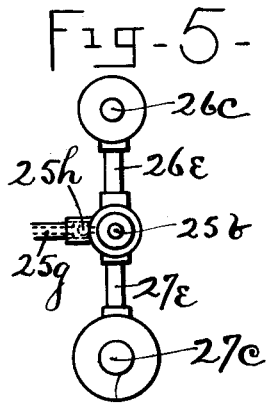
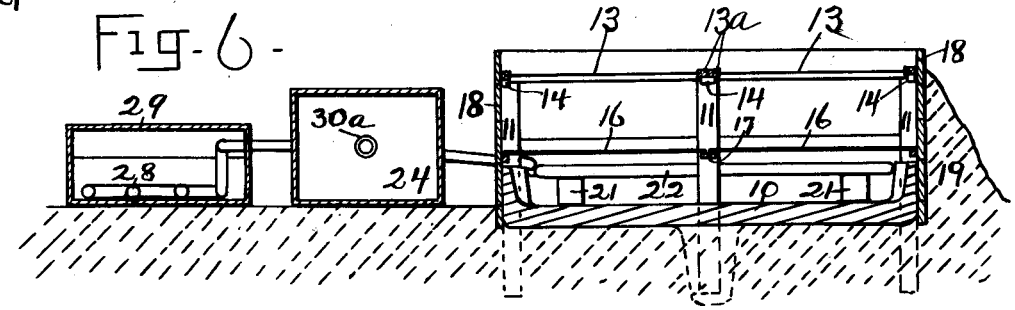

HENRY E. WILLSIE, OF NEW YORK, N. Y.

APPARATUS FOR UTILIZING SOLAR HEAT.

1,101,000. Specification of Letters Patent. Patented June 23, 1914.

Application filed June 1, 1903. Serial No. 159,555.

*To all whom it may concern:*

Be it known that I, HENRY E. WILLSIE, a citizen of the United States, residing at New York, in the county of New York and State of New York, have invented new and useful Improvements in Apparatus for Utilizing Solar Heat, of which the following is a specification.

My invention relates to improvements in solar apparatus in which a vapor generated by heat from the sun is used in a suitable engine to do useful work.

The objects of my invention are to provide means for storing solar heat, for producing a vapor pressure from solar heat or from the stored heat, and for utilizing the vapor pressure to generate power. I attain these objects by the device shown in the accompanying drawing, in which:

Figure 1 is a vertical cross-section of the solar-heat receiving and storing compartment; Fig. 2 is a diagrammatic plan view of the entire apparatus; Fig. 3 is an enlarged vertical cross-section of the glass supports; Fig. 4 is a sectional view of the escaped vapor pump; Fig. 5 is an end view of the same; and Fig. 6 is a vertical cross section through Fig. 2 on the line X—X in the direction of the arrow A.

Similar characters refer to similar parts throughout the several views.

The heat receiving and storing compartment consists of a liquid holding basin above which are supported sheets of glass. The sides of the compartment are adapted to prevent the heat escaping.

The basin 10 is made of cement, or other suitable material, laid upon the sand. The supports 11, 11 are wooden posts set in the ground. To prevent the basin leaking about the central supports, the lower portions of these supports are entirely inclosed in the cement of the basin in the manner shown. To the upper ends of the supports 11, 11 are secured, the wooden beams 12, 12 provided with the lengthwise grooves 12ᵃ and 12ᵇ. The sheets or panes of glass 13, 13 are mounted in sashes 13ᵃ, 13ᵃ similar to window sashes. These sashes are supported in the grooves 12ᵃ, 12ᵇ, and are further supported by the braces 14, 14, secured to the beams 12, 12. To the supports 11, 11, are also secured wooden beams 15, 15, provided with the grooves 15ᵃ, 15ᵇ. In these grooves rest the upper and lower edges of the sheets of glass 16, 16. These sheets of glass are further supported by the braces 17, 17. To the side posts or supports, are secured the planks 18, 18. To further insulate the sides of the compartment sand or ashes may be banked against the planks as shown at 19.

In the Northern Hemisphere some advantage is gained by inclining the planks 20, 20 at the north side of the compartment in the manner shown. The east and west sides of the compartment may be formed in the same manner. The inclination of the beams 12 and 15 should be such as to least obstruct the sun's rays in December.

The basin 10 is preferably filled with water, although the apparatus is operative without the water. Or instead of water a solution of chlorin of calcium, or liquid asphalt may be used. The depth and size of the basin depend upon the amount of heat it is desired to store in the water. The surface exposed to the sun is enlarged by duplicating the parts shown.

I have discovered that there is an advantage in exposing the heat collecting liquid directly to the sun's rays instead of exposing the container of the heat collecting liquid. The light rays which readily pass through the glass and into the liquid are changed by the liquid into heat rays which cannot so easily pass back through the glass. For this reason a greater proportion of the solar energy entering the heater is changed into available heat than if there were no liquid exposed directly to the sun's rays; for without the liquid a considerable portion of the actinic or light rays are reflected back through the glass and lost.

Upon the blocks 21, 21 is laid the vaporizing pipe 22. I have found that a natural circulation caused by differences in temperature in the heat collecting liquid, is restricted to a small area or zone, and that for a solar power plant large enough to be useful heat cannot be collected from a sufficiently large area and conveyed by natural circulation to a vaporizer outside the heater. On the other hand to cover the entire heat collecting surface with vaporizing pipes would make the cost too great. I therefore, place the pipes, 22, 22, so far apart that each pipe will be in a separate zone of natural circulation in the heat collecting liquid. The hot liquid about the vaporizing pipe is cooled, flows down to the bottom of the reservoir and up between the pipes to the surface again. This pipe contains sulfur dioxid, carbon dioxid, ammonia or some other liquid that vaporizes at a low temperature. One end of the pipe 22 leads out of the heat compartment to the engine 23 of the usual reciprocating type, although an engine of another type, or a turbine may be used. When sulfur dioxid, ammonia or similar substances are used in an engine, precautions should be taken to prevent leaking. It is also objectionable to have moisture carried into the cylinder by the reciprocating piston rod. For this reason all the moving parts of the engine, except the driving pulley are tightly inclosed in the case 24. In this case is put quick lime or chlorid of calcium, or some other substance that will absorb the moisture within the case.

To prevent the loss of vapor at the packing points of the piston-rod and the valve-rod, an escaped vapor pump 25 is provided, the details of which are shown in Figs. 4 and 5. The packing case 26 contains the packing $26^a$ and the gland $26^b$ surrounding the valve rod $26^c$. The packing is held in place by the nut $26^d$. The gland $26^b$ is recessed as shown and these recesses are connected with the escaped vapor pump by the tube $26^e$. The piston rod $27^c$ is similarly surrounded by the packing $27^a$ and the gland $27^b$ held in the case 27 by the nut $27^d$. The gland $27^b$ is connected with the escaped vapor pump by the tube $27^e$. The escaped vapor pump consists of the casing $25^a$ within which is the piston $25^b$ surrounded by the packing $25^c$ held in place by the nut $25^d$. At the point $25^e$ this pump is connected to the exhaust pipe of the engine by the tube $25^g$. This opening of the escaped-vapor pump is closed by the ball-valve $25^b$.

In operation, any vapor escaping along the valve-rod or piston-rod is drawn from the recesses of the glands into the pump and by it compressed and driven into the exhaust. This pump is operated by an eccentric connected to the rod $25^b$ and may be made to pump into any part of the vapor system.

The exhaust of the engine is connected with one end of the condensing pipe 28 laid in the trough 29, which is covered, to protect the pipes from the sun's rays. The other end of the condensing pipe 28 connects with the feed pump 30. This feed pump consists of the casing $30^a$ secured to the engine 23, the piston $30^b$, which is an extension of the engine piston, and the valves $30^c$, $30^d$.

As is well known, the feed pump will be more efficient if it is located so as to have a gravity feed from the condensing pipes.

The engine is shown connected by the belt 31 to the centrifugal water pump 32, which discharges into the trough 29.

The operation of the apparatus is as follows: The sun's heat passing through the glass 13 and 16 is absorbed and stored principally by the water in the basin. The described construction permits this heat to escape only very slowly. The solar rays on the pipes 22 and the heat of the water vaporize the sulfur dioxid or ammonia in the pipe. The heat stored in the water will continue for some time to generate vapor in the pipes after the sun has stopped shining. As the water next to the pipe cools, warm water is brought in contact with the pipe by convection, or by a mechanically induced current in the water. The expanded vapor, now having a high pressure, passes to the engine, operates it, and exhausts into condensing pipe 28. The centrifugal pump is continuously pumping cool water from a well, or river, into the trough 29 through which it flows in the direction of the arrows B, B. This cool water reduces the temperature of the vapor in the pipe 28 so that, with the back pressure in the pipe 28, it liquefies. This liquid sulfur dioxid or ammonia is then pumped by the feed pump 30 into the vaporizing pipe 22. The condensing pipes may be put in a river of cool water instead of in the trough.

The apparatus as shown here is designed principally for pumping water for irrigation, although other machinery may be driven from the pulley $32^a$.

My invention is not restricted to the precise construction and arrangement shown and it may be modified and re-arranged without departing from the spirit and scope of my invention.

Having now described my invention, what I claim and desire to secure by Letters Patent, is—

1. In a solar apparatus, the combination of a transparently covered receptacle adapted to contain a liquid and to expose the liquid to the sun's rays, vaporizing pipes located within said receptacle and connected in an operative cycle to a condenser, an engine and feed pump, and means for holding each pipe of said vaporizer in a separate zone of natural circulation of said liquid.

2. In a solar apparatus, the combination of a transparently covered receptacle adapted to contain and expose a liquid directly to the sun's rays, a vaporizer consisting of pipes arranged horizontally slightly below the surface of said liquid, each pipe being located in a separate zone of natural circulation of said liquid.

3. In a solar apparatus, the combination of a vaporizer adapted to contain a motive fluid and connected in an operative cycle with an engine, feed pump and condenser, a transparently covered receptacle adapted to contain and expose a liquid to the sun's rays, means for securing each pipe of said vaporizer slightly below the surface of a liquid in said receptacle, and means for setting up zones of circulation in the liquid in said receptacle.

4. In a solar apparatus, vaporizing pipes adapted to contain a volatile liquid and connected in an operative cycle with an engine, feed pump and condenser, a transparently covered receptacle adapted to contain a liquid having a higher boiling point than said volatile liquid contained in the vaporizing pipes, means for securing said vaporizing pipes horizontally slightly below the surface of the liquid in said receptacle, and means for locating each pipe in a separate zone of natural circulation of said liquid in the receptacle.

5. In a solar apparatus, the combination of vaporizing pipes adapted to contain a volatile liquid and connected in an operative cycle with an engine, condenser and feed pump, a receptacle adapted to contain a liquid having a higher boiling point than said volatile liquid, means for exposing the liquid in said receptacle to the sun's rays, means for securing the vaporizing pipes horizontally slightly below the surface of the liquid in said receptacle, each pipe being located in a separate zone of natural circulation of said liquid.

In testimony whereof, I have signed my name to this specification in the presence of two subscribing witnesses, this eleventh day of May, 1903.

HENRY E. WILLSIE.

Witnesses:
    WALTER COX,
    F. E. MCCRARY.